United States Patent
Lewensztain

(10) Patent No.: US 12,507,716 B1
(45) Date of Patent: Dec. 30, 2025

(54) TWO STAGE DEHYDRATION METHOD FOR PLANT BASED FOOD PROCESSING

(71) Applicant: That's It Nutrition, LLC, Los Angeles, CA (US)

(72) Inventor: Lior Lewensztain, Los Angeles, CA (US)

(73) Assignee: That's It Nutrition, LLC, Los Angeles, CA (US)

( * ) Notice: Subject to any disclaimer, the term of this patent is extended or adjusted under 35 U.S.C. 154(b) by 0 days.

(21) Appl. No.: 19/223,139

(22) Filed: May 30, 2025

Related U.S. Application Data

(60) Provisional application No. 63/810,164, filed on May 22, 2025.

(51) Int. Cl.
| | | |
|---|---|---|
| *A23L 7/10* | (2016.01) | |
| *A23L 5/30* | (2016.01) | |
| *A23L 19/00* | (2016.01) | |

(52) U.S. Cl.
CPC ............................ *A23L 7/10* (2016.08); *A23L 5/34* (2016.08); *A23L 19/00* (2016.08)

(58) Field of Classification Search
CPC .................................. A23L 5/34; A23L 19/01
See application file for complete search history.

(56) References Cited

U.S. PATENT DOCUMENTS

| | | |
|---|---|---|
| 4,225,628 A | 9/1980 | Lynn |
| 4,341,803 A | 7/1982 | Koshida et al. |
| 4,406,072 A | 9/1983 | Van Iterson |
| 4,434,345 A | 2/1984 | Muscatell |
| 4,506,799 A | 3/1985 | Mason, Jr. |
| 4,515,822 A | 5/1985 | Kraig et al. |
| 4,549,250 A | 10/1985 | Spector |
| 4,738,858 A | 4/1988 | Mukouyama et al. |
| 4,757,674 A | 7/1988 | Compton |
| 4,764,385 A | 8/1988 | Butland |
| 4,778,681 A | 10/1988 | Kuwabara |
| 4,828,866 A | 5/1989 | Wade et al. |
| 4,866,950 A | 9/1989 | Kiczek |
| 4,893,458 A | 1/1990 | Compton |
| 4,950,491 A | 8/1990 | Varga |
| 5,020,237 A | 6/1991 | Gross et al. |
| 5,039,947 A | 8/1991 | Kraszewski et al. |
| 5,071,668 A | 12/1991 | Van Lengerich et al. |
| 5,079,012 A | 1/1992 | Lengerich et al. |
| 5,135,122 A | 8/1992 | Gross et al. |
| 5,466,455 A | 11/1995 | Huffstutler, Jr. et al. |

(Continued)

OTHER PUBLICATIONS

Zhang et al. (2017) Recent developments in high-quality drying of vegetables, fruits, and aquatic products, Critical Reviews in Food Science and Nutrition, 57:6, 1239-1255, DOI: 10.1080/10408398.2014.979280 (Year: 2017).*

(Continued)

*Primary Examiner* — Michele L Jacobson
(74) *Attorney, Agent, or Firm* — Cooley LLP

(57) ABSTRACT

A process is disclosed for creating a shelf-stable, grain-free, plant-based food composition with a crisp texture and integrated seasoning. The food compositions taught herein exhibit a low moisture content, high fiber content, and a desirable crispness that is maintained even when combined with milk or milk alternatives, enabling use as a grain-free breakfast cereal.

10 Claims, 5 Drawing Sheets

(56) References Cited

U.S. PATENT DOCUMENTS

| | | |
|---|---|---|
| 5,595,775 A | 1/1997 | Tishel |
| 5,962,057 A | 10/1999 | Durance et al. |
| 6,299,923 B1 | 10/2001 | Meziane |
| 6,881,936 B2 | 4/2005 | Shon et al. |
| 7,438,943 B2 | 10/2008 | Khairullah et al. |
| 7,549,228 B2 | 6/2009 | Panopoulos |
| 7,556,836 B2 | 7/2009 | Mueller et al. |
| 8,071,150 B2 | 12/2011 | Anand et al. |
| 8,173,190 B2 | 5/2012 | Singer et al. |
| 8,601,707 B2 | 12/2013 | Meritt |
| 8,814,987 B2 | 8/2014 | Tschantz et al. |
| 9,204,658 B2 | 12/2015 | Nacenta Anmella |
| 10,485,254 B2 | 11/2019 | Roy et al. |
| 10,966,439 B2 | 4/2021 | Lam Nguyen |
| 11,076,612 B2 | 8/2021 | Einhorn |
| 11,259,527 B2 | 3/2022 | Shinde et al. |
| 11,523,628 B2 | 12/2022 | Roy et al. |
| 11,559,556 B2 | 1/2023 | Medina Cruz et al. |
| 12,070,045 B2 | 8/2024 | Ragonesse |
| 12,092,580 B1 | 9/2024 | Elkarim Albadri et al. |
| 2002/0197361 A1 | 12/2002 | Ehrman |
| 2003/0194302 A1 | 10/2003 | Hickinbotham |
| 2004/0025366 A1 | 2/2004 | Soucy |
| 2004/0104223 A1 | 6/2004 | Shon et al. |
| 2004/0185145 A1 | 9/2004 | Ehrman et al. |
| 2004/0265451 A1 | 12/2004 | Rooks et al. |
| 2006/0029709 A1 | 2/2006 | Zweben |
| 2006/0034980 A1 | 2/2006 | Perdue |
| 2006/0051492 A1 | 3/2006 | Mueller et al. |
| 2006/0093712 A1 | 5/2006 | Khairullah et al. |
| 2006/0115573 A1 | 6/2006 | Singer et al. |
| 2006/0226165 A1 | 10/2006 | Panopoulos |
| 2007/0012018 A1 | 1/2007 | Pellenc et al. |
| 2007/0092626 A1 | 4/2007 | Singer et al. |
| 2007/0248741 A1 | 10/2007 | Foster et al. |
| 2008/0206424 A1 | 8/2008 | Villagran |
| 2008/0264069 A1 | 10/2008 | Dorsey |
| 2009/0162504 A1 | 6/2009 | Anand et al. |
| 2009/0304865 A1 | 12/2009 | Ashourian et al. |
| 2010/0143564 A1 | 6/2010 | Nacenta Anmella |
| 2011/0091616 A1 | 4/2011 | Jimenez Mendoza |
| 2011/0110723 A1 | 5/2011 | Varma et al. |
| 2011/0159157 A1 | 6/2011 | De Rocco et al. |
| 2011/0305809 A1 | 12/2011 | Madsen et al. |
| 2012/0204720 A1 | 8/2012 | Tschantz et al. |
| 2013/0160697 A1 | 6/2013 | Meritt |
| 2013/0209623 A1 | 8/2013 | Beaumont |
| 2014/0106034 A1 | 4/2014 | Dos Santos et al. |
| 2014/0308424 A1 | 10/2014 | Bai et al. |
| 2015/0342228 A1* | 12/2015 | Norris ............... A23B 7/06 426/244 |
| 2015/0366249 A1 | 12/2015 | Lock et al. |
| 2016/0000848 A1 | 1/2016 | Koganov et al. |
| 2016/0053199 A1 | 2/2016 | Clodoveo |
| 2016/0073630 A1 | 3/2016 | Kostka |
| 2016/0081377 A1 | 3/2016 | Zukerman et al. |
| 2016/0166114 A1 | 6/2016 | Tran et al. |
| 2017/0265508 A1 | 9/2017 | Roy et al. |
| 2018/0160708 A1 | 6/2018 | Eisner |
| 2020/0085086 A1 | 3/2020 | Roy et al. |
| 2020/0289600 A1 | 9/2020 | Medina Cruz et al. |
| 2020/0315225 A1 | 10/2020 | Vazquez Del Mercado et al. |
| 2020/0367532 A1 | 11/2020 | Nguyen |
| 2022/0192241 A1 | 6/2022 | Saibene et al. |
| 2022/0211068 A1 | 7/2022 | Rubin et al. |
| 2022/0225649 A1* | 7/2022 | Vazquez Del Mercado ............. A23L 5/17 |
| 2022/0408769 A1 | 12/2022 | Eisner et al. |
| 2023/0047543 A1 | 2/2023 | Eisner et al. |
| 2023/0398163 A1 | 12/2023 | Monckeberg Vergara et al. |
| 2024/0041062 A1 | 2/2024 | Tenney et al. |
| 2024/0065284 A1 | 2/2024 | Rubin et al. |
| 2024/0269209 A1 | 8/2024 | Landers |
| 2024/0365800 A1 | 11/2024 | Rojas Vera et al. |
| 2024/0381895 A1 | 11/2024 | Phillips et al. |
| 2025/0064097 A1 | 2/2025 | Saibene et al. |

OTHER PUBLICATIONS

Siebert et al. "Serial combination drying processes: a measure to improve quality of dried carrot disks and to reduce drying time" Drying Technology, 2018, vol. 36(13), p. 1578-1591 (Year: 2018).*

* cited by examiner

TWO STAGE DEHYDRATION METHOD FOR PLANT BASED FOOD PROCESSING

CROSS REFERENCE TO RELATED APPLICATION

The present application claims the benefit of priority to U.S. Provisional Application No. 63/810,164, which was filed on May 22, 2025, and entitled: Plant Material Processing for Consumables, the entire disclosure of which is hereby incorporated by reference in its entirety for all purposes.

FIELD OF THE DISCLOSURE

The disclosure relates to food compositions and methods for producing same. The food compositions disclosed herein have minimally processed ingredients, particular moisture contents, and are composed in such a way that leads to favorable organoleptic properties.

BACKGROUND

The modern American diet is characterized by a high intake of ultra-processed foods and a persistent deficiency in the recommended daily consumption of fruits and vegetables. This imbalance is widely recognized as a significant contributor to rising obesity rates and related metabolic disorders. These conditions, in turn, are associated with substantial public health burdens and a decline in overall quality of life.

Increasing the intake of minimally processed fruits and vegetables is a well-documented strategy for improving nutritional outcomes and reducing obesity-related risks. However, longstanding behavioral barriers have hindered the widespread adoption of healthier eating habits. Consumers often favor convenient, hyper-palatable snack products readily available in the processed food aisle, contributing to a pattern of habitual poor dietary choices.

Accordingly, there remains a critical need for food products that are both nutritionally beneficial and accessible in form-specifically, snackable formats made from minimally processed, plant-based ingredients. Such innovations may serve to bridge the gap between health-conscious dietary goals and actual consumer behavior, promoting better long-term health outcomes.

BRIEF SUMMARY OF DISCLOSURE

The present disclosure provides a solution to the persistent challenge of increasing consumer adoption of healthier, minimally processed foods by offering a process for producing snackable, plant-based food compositions. By leveraging a two-stage dehydration method—including a final microwave-based drying step that facilitates seasoning absorption and enhances texture—the disclosed method yields shelf-stable, crisp snacks that are both nutritious and appealing to modern consumers.

The disclosure teaches a process for creating a shelf-stable, grain-free, plant-based food composition with a crisp texture and integrated seasoning.

Aspects of the taught process include: providing a base plant material in a defined form factor; subjecting the plant material to a first dehydration step using a heat source to reduce moisture content; seasoning the partially dehydrated material with a flavoring ingredient; and exposing the seasoned material to a second heat source—for example a microwave heat source—to further reduce moisture and promote absorption of the seasoning.

In aspects, the final product exhibits a low moisture content, high fiber content, and a desirable crispness that is maintained even when combined with milk or milk alternatives, enabling use as a grain-free breakfast cereal.

The disclosure also includes kits comprising the food composition, consumer packaging, and instructions for use In some aspects, the techniques described herein relate to a process for creating a food composition, including: (a) providing a base plant material form factor; (b) exposing said base plant material to a first heat source to dehydrate the base plant material and create a first dehydrated base plant material form factor; (c) seasoning the first dehydrated base plant material form factor with an ingredient to create a seasoned first dehydrated base plant material form factor; and (d) exposing said seasoned first dehydrated base plant material form factor to a second heat source to create a seasoned second dehydrated base plant material form factor.

In some aspects, the techniques described herein relate to a process, wherein the base plant material is a fruit.

In some aspects, the techniques described herein relate to a process, wherein the base plant material is a vegetable.

In some aspects, the techniques described herein relate to a process, wherein the base plant material is a plant tissue.

In some aspects, the techniques described herein relate to a process, wherein the base plant material is not a grain.

In some aspects, the techniques described herein relate to a process, wherein the base plant material form factor is at least one selected from the group consisting of: a polygon, a quadrilateral, and an ellipse.

In some aspects, the techniques described herein relate to a process, wherein the base plant material form factor is at least one selected from the group consisting of: a triangle, a quadrilateral, a pentagon, a hexagon, a heptagon, an octagon, a nonagon, and a decagon.

In some aspects, the techniques described herein relate to a process, wherein the base plant material form factor is at least one selected from the group consisting of: a parallelogram, a rhombus, a kite, a rectangle, a square, a trapezoid, and an isosceles trapezoid.

In some aspects, the techniques described herein relate to a process, wherein the base plant material form factor is at least one selected from the group consisting of: an oval and a circle.

In some aspects, the techniques described herein relate to a process, wherein the base plant material form factor is at least one selected from the group consisting of: a chip or a crisp.

In some aspects, the techniques described herein relate to a process, wherein the first heat source is at least one selected from the group consisting of: a radiant heat source, a convective heat source, and a conductive heat source.

In some aspects, the techniques described herein relate to a process, wherein the first heat source is hot air.

In some aspects, the techniques described herein relate to a process, wherein the first heat source is hot air administered under vacuum conditions.

In some aspects, the techniques described herein relate to a process, wherein the first dehydrated base plant material form factor includes no more than about 40% water.

In some aspects, the techniques described herein relate to a process, wherein the first dehydrated base plant material form factor includes no more than about 30% water.

In some aspects, the techniques described herein relate to a process, wherein the first dehydrated base plant material form factor includes no more than about 20% water.

In some aspects, the techniques described herein relate to a process, wherein the first dehydrated base plant material form factor includes no more than about 15% water.

In some aspects, the techniques described herein relate to a process, wherein the first dehydrated base plant material form factor includes no more than about 12% water.

In some aspects, the techniques described herein relate to a process, wherein the first dehydrated base plant material form factor includes between about 25%-45% water; 20%-40% water; 15%-35% water; 10%-30% water; 10%-25% water; 10%-20% water; 10%-15% water; 5%-25% water; 5%-20% water; 5%-15% water; 5%-10% water.

In some aspects, the techniques described herein relate to a process, wherein the first dehydrated base plant material form factor includes between about 10% water and about 15% water.

In some aspects, the techniques described herein relate to a process, wherein the ingredient is at least one selected from the group consisting of: heterologous plant material, homologous plant material, fruit matter, vegetable matter, plant tissue matter, non-plant matter, mineral, and salt.

In some aspects, the techniques described herein relate to a process, wherein the first dehydrated base plant material form factor is seasoned with an ingredient including a heterologous plant material.

In some aspects, the techniques described herein relate to a process, wherein the first dehydrated base plant material form factor is seasoned with an ingredient including a homologous plant material.

In some aspects, the techniques described herein relate to a process, wherein the first dehydrated base plant material form factor is seasoned with an ingredient including fruit matter.

In some aspects, the techniques described herein relate to a process, wherein the first dehydrated base plant material form factor is seasoned with an ingredient including vegetable matter.

In some aspects, the techniques described herein relate to a process, wherein the first dehydrated base plant material form factor is seasoned with an ingredient including plant tissue matter.

In some aspects, the techniques described herein relate to a process, wherein the first dehydrated base plant material form factor is seasoned with an ingredient not including plant matter.

In some aspects, the techniques described herein relate to a process, wherein the first dehydrated base plant material form factor is seasoned with an ingredient including a mineral.

In some aspects, the techniques described herein relate to a process, wherein the first dehydrated base plant material form factor is seasoned with an ingredient including salt.

In some aspects, the techniques described herein relate to a process, wherein the seasoned first dehydrated base plant material form factor includes a fruit base plant material seasoned with matter from another fruit.

In some aspects, the techniques described herein relate to a process, wherein the seasoned first dehydrated base plant material form factor includes a vegetable base plant material seasoned with salt.

In some aspects, the techniques described herein relate to a process, wherein the second heat source is at least one selected from the group consisting of: a radiant heat source, a convective heat source, and a conductive heat source.

In some aspects, the techniques described herein relate to a process, wherein the second heat source is an electromagnetic radiation heat source.

In some aspects, the techniques described herein relate to a process, wherein the second heat source is a microwave heat source.

In some aspects, the techniques described herein relate to a process, wherein the seasoned second dehydrated base plant material form factor includes no more than about 10% water, 9% water, 8% water, 7% water, 6% water, 5% water, 4% water, 3% water, 2.5% water, 2.0% water, 1.5% water, or 1.0% water.

In some aspects, the techniques described herein relate to a process, wherein the seasoned second dehydrated base plant material form factor includes no more than about 2.5% water.

In some aspects, the techniques described herein relate to a process, wherein the seasoned second dehydrated base plant material form factor includes between about 0.5%-5%, 0.5%-4%, 0.5%-3%, 0.5%-2%; 1%-10%, 1%-9%, 1%-8%, 1%-7%, 1%-6%, 1%-5%, 1%-4%, 1%-3%, 1%-2-%; 1.5%-5%, 1.5-4%, 1.5%-3%, 1.5%-2.5% 1.5%-2.0% water.

In some aspects, the techniques described herein relate to a process, wherein the seasoned second dehydrated base plant material form factor includes a fruit base plant material seasoned with matter from another fruit.

In some aspects, the techniques described herein relate to a process, wherein the seasoned second dehydrated base plant material form factor includes an apple base plant material seasoned with cinnamon.

In some aspects, the techniques described herein relate to a process, wherein the seasoned second dehydrated base plant material form factor includes an apple base plant material seasoned with matter from at least one other fruit selected from the group consisting of: strawberry, blueberry, mango, and banana.

In some aspects, the techniques described herein relate to a process, wherein the seasoned second dehydrated base plant material form factor includes a vegetable base plant material seasoned with salt.

In some aspects, the techniques described herein relate to a food composition produced by the process.

In some aspects, the techniques described herein relate to a food composition, further including milk.

In some aspects, the techniques described herein relate to a food composition, further including a fruit.

In some aspects, the techniques described herein relate to a kit.

In some aspects, the techniques described herein relate to a food composition, including: a seasoned dehydrated base plant material form factor, wherein the base plant material form factor has been exposed to two separate heating processes and a seasoning process; wherein the first heating process includes convective hot air drying and the second heating process includes microwave irradiation; wherein the seasoning process includes exposure to a seasoning ingredient after the first heating process and before the second heating process; and wherein the seasoning ingredient is absorbed into the base plant material during exposure to the second heating process.

In some aspects, the techniques described herein relate to a food composition, wherein the seasoned dehydrated base plant material form factor includes no more than about 5% water.

In some aspects, the techniques described herein relate to a food composition, wherein the seasoned dehydrated base plant material form factor includes no more than about 2.5% water.

In some aspects, the techniques described herein relate to a food composition, wherein the seasoned dehydrated base plant material form factor includes between about 1.5% water and about 2.5% water.

In some aspects, the techniques described herein relate to a food composition, wherein the seasoned dehydrated base plant material form factor includes a fruit or vegetable base plant material.

In some aspects, the techniques described herein relate to a food composition, wherein the seasoning ingredient is at least one selected from the group consisting of: heterologous plant material, homologous plant material, fruit matter, vegetable matter, plant tissue matter, non-plant matter, mineral, and salt.

In some aspects, the techniques described herein relate to a food composition, wherein the seasoned dehydrated base plant material form factor includes a fruit base plant material and the seasoning ingredient is another fruit.

In some aspects, the techniques described herein relate to a food composition, wherein the seasoned dehydrated base plant material form factor includes an apple base plant material and the seasoning ingredient is cinnamon.

In some aspects, the techniques described herein relate to a food composition, wherein the seasoned dehydrated base plant material form factor includes an apple base plant material and the seasoning ingredient is matter from at least one other fruit selected from the group consisting of: strawberry, blueberry, mango, and banana.

In some aspects, the techniques described herein relate to a food composition, wherein the seasoned dehydrated base plant material form factor includes a vegetable base plant material and the seasoning ingredient is salt.

In some aspects, the techniques described herein relate to a food composition, further including milk.

In some aspects, the techniques described herein relate to a food composition, further including a fruit.

In some aspects, the techniques described herein relate to a kit, including any of the food compositions taught herein.

In some aspects, a grain free fruit cereal is taught.

DETAILED DESCRIPTION

Seasoning Ingredient

Figure 1:
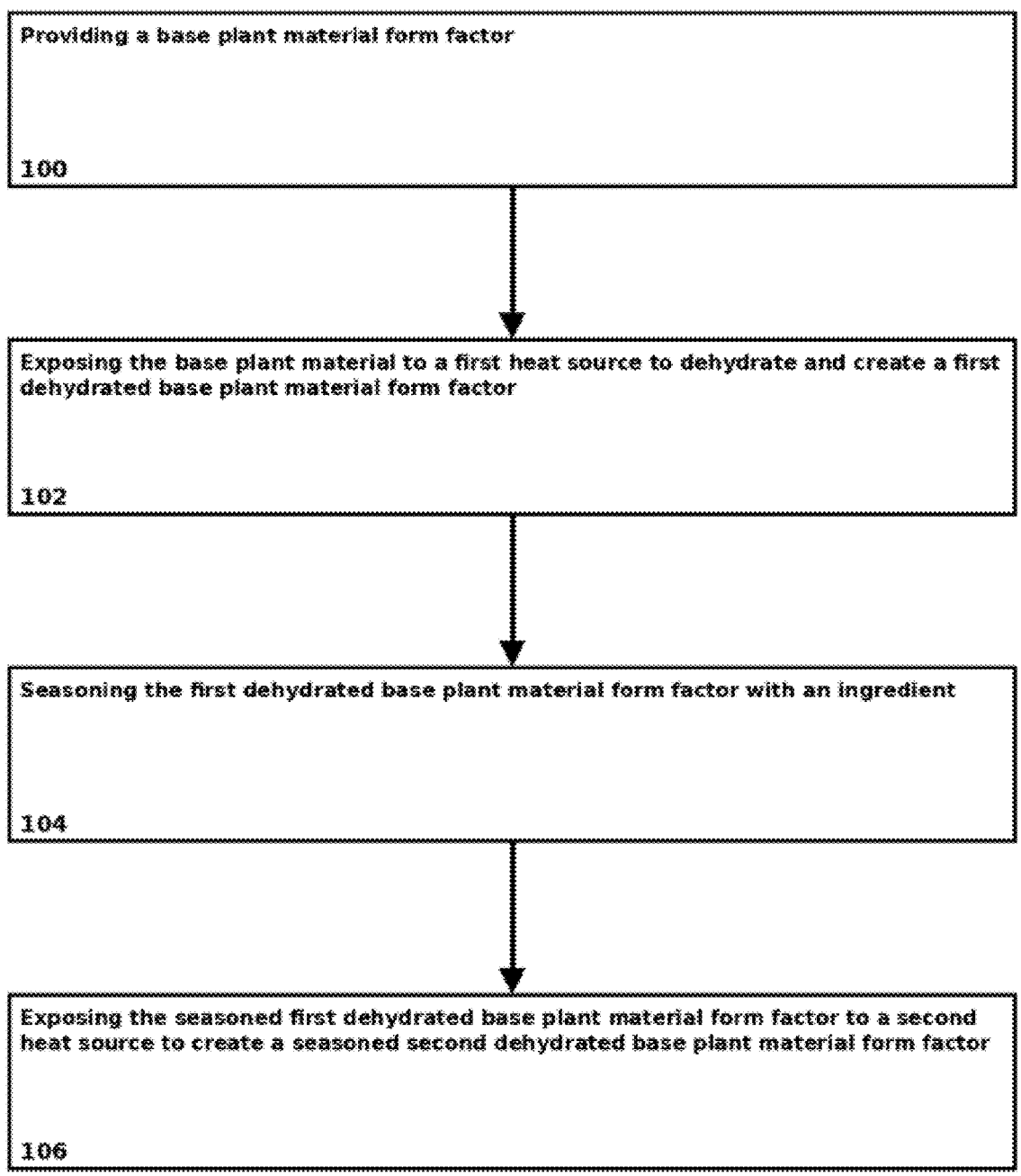
FIG. 1 is a flowchart illustrating a process for creating a food composition. Each numbered element corresponds to a step, in a particular embodiment of the disclosed process.

The present disclosure relates to methods for preparing shelf-stable, minimally processed, plant-based snack products. More specifically, it provides a process for converting a base plant material into a snackable composition through controlled dehydration and seasoning steps, while preserving desirable nutritional and sensory properties.

Base Plant Material

The term base plant material refers to any edible portion of a plant that may serve as the foundational input for the food composition. This includes, but is not limited to, fruits (e.g., apples, mangoes, bananas), vegetables (e.g., sweet potatoes, carrots, beets), and other edible plant tissues such as tubers, stems, or fleshy leaves. The base plant material may be selected to optimize texture, sugar content, fiber, or antioxidant profile. In embodiments, the base plant material is not a grain, thereby excluding items such as wheat, corn, rice, or barley. This distinction ensures that the resulting food product retains its character as a whole plant-based composition with minimal refinement.

Base Plant Material Form Factor

The base plant material may be processed into specific form factors prior to dehydration. These may include shapes selected for ease of consumption, uniform dehydration, or consumer appeal.

Suitable form factors include geometric shapes such as triangles, quadrilaterals, pentagons, hexagons, heptagons, octagons, nonagons, decagons, parallelograms, *rhombi*, kites, rectangles, squares, trapezoids, isosceles trapezoids, ellipses, ovals, and circles. In some embodiments, the form factor resembles a traditional chip or crisp, contributing to its snackability and commercial appeal.

These shapes may be formed using mechanical slicing, die-cutting, or molding, and can vary in thickness depending on the moisture content and structural integrity of the starting material.

First Heat Source/First Dehydration Step

The first heat source is used to dehydrate the base plant material, resulting in a first dehydrated base plant material form factor. This heat source may operate via radiant (e.g., infrared), convective (e.g., hot air oven), or conductive (e.g., contact with a heated surface) mechanisms. The purpose of this step is to remove moisture while preserving the structural integrity and nutritional value of the base material.

In certain embodiments, the first dehydration step reduces the moisture content to no more than a defined threshold (e.g., ≤15% by weight), or within a defined range (e.g., about 8% to about 12% moisture), to prevent microbial growth and to promote stability.

Seasoning Step

Following the initial dehydration, the material is seasoned to create a seasoned first dehydrated base plant material form factor. The seasoning step may involve applying particulate or liquid matter to the surface of the dehydrated material. Seasonings may include:

Homologous plant matter: e.g., applying apple extract to a base of dehydrated apple slices. In the present disclosure, "homologous" is a relational term that compares plants of the same genus and species, e.g. apples to apples.

Heterologous plant matter: e.g., applying beet powder to sweet potato slices. In the present disclosure, "heterologous" is a relational term that compares plants of a different genus and species, e.g. apples to blueberries.

Fruit-based flavorants: e.g., concentrated mango purée or dried berry dust.

Vegetable-based flavorants: e.g., dehydrated tomato flakes or powdered kale.

General plant tissue additives: including herbs, spices, essential oils, or fiber-rich powders. Minerals such as salt.

The seasoning may be applied via dusting, spraying, or tumbling. The seasoning may be bound to the surface using a food-safe binder (e.g., citrus fiber, pectin, or oil mist). Or, the seasoning may not utilize a binder at all, but rather will be absorbed into the plant material during the second dehydration step utilizing a microwave heat source.

Second Heat Source/Final Dehydration Step

After seasoning, the seasoned first dehydrated base plant material form factor is subjected to a second heat source. This second dehydration step serves to lock in the seasoning and further reduce residual moisture, yielding a seasoned second dehydrated base plant material form factor.

The second heat source may again include radiant, convective, or conductive methods. In some embodiments, this heat source includes electromagnetic radiation, such as microwave energy, which provides rapid volumetric heating and may enhance crispiness without degrading the seasoning layer.

The final moisture content may also be controlled to achieve a target water activity level. Preferred moisture content may be no more than, for example, 5%, or within a range such as 2-6%, depending on the desired texture and shelf life.

Resulting Food Composition

The end product—a seasoned second dehydrated base plant material form factor—is a ready-to-eat, shelf-stable snack that preserves the natural character of the plant source. It is crisp in texture, depending on dehydration parameters, and offers enhanced palatability through seasoning. The resulting food composition provides a nutritious, minimally processed alternative to conventional ultra-processed snack foods, meeting consumer demand for plant-based convenience products.

Resulting Food Composition+Milk

The end product—a seasoned second dehydrated base plant material form factor—is able to be combined with milk to produce a grain free cereal for consumption.

The food composition produced by the process disclosed herein may be utilized as a grain-free alternative to conventional breakfast cereals. Specifically, the seasoned second dehydrated base plant material form factor—comprising dehydrated fruit slices processed to a final moisture content of approximately 1.5-2.5%—may be combined with a liquid such as dairy milk, plant-based milk (e.g., oat milk, almond milk, soy milk), or other nutritional beverages.

Despite exposure to moisture during consumption, the food composition maintains a crisp texture for a prolonged period due to its low residual water content and the cellular structure imparted by the microwave-assisted final dehydration step. This structural integrity contrasts with traditional grain-based cereals, which rapidly lose crispness when immersed in milk. As a result, the disclosed composition delivers a satisfying crunch and extended bowl life, enhancing sensory appeal.

Moreover, the absence of grains in the formulation meets the growing demand for gluten-free and clean-label breakfast options. The base plant materials, which may include fruits such as apples, contribute inherent sweetness, while seasoning options such as cinnamon, or powdered fruit enhance flavor without requiring added sugars or artificial ingredients. This composition is particularly suitable for consumers seeking minimally processed, nutrient-dense alternatives to conventional breakfast cereals.

In certain embodiments, the disclosed food composition is intended for use in combination with milk or milk-like beverages to serve as a grain-free breakfast cereal or snack. As used herein, the term milk is not limited to traditional dairy-based milk from animal sources (e.g., cow's milk, goat's milk), but broadly encompasses a range of plant-derived milk alternatives including, but not limited to: almond milk, soy milk, oat milk, coconut milk, cashew milk, rice milk, and hemp milk. These milk alternatives are typically formulated to emulate the viscosity, mouthfeel, and nutritional properties of dairy milk, making them suitable for cereal applications.

When the food composition taught herein is combined with milk or a milk alternative, the product maintains its crispness for a prolonged period due to its low moisture content and microstructural characteristics imparted by the dual-dehydration process. In particular, the microwave-assisted final drying step is believed to create internal porosity that resists immediate saturation upon immersion in liquid. The resulting product behaves analogously to puffed or toasted cereals, yet remains entirely grain-free, free of added sugars, and composed primarily of whole fruit or vegetable materials. This enables consumers to enjoy a ready-to-eat cereal experience that aligns with clean-label, allergen-free, and paleo or gluten-free dietary preferences.

Nutritional Benefits

The disclosed food compositions offer a range of nutritional advantages that stem from the use of whole, minimally processed plant materials. Notably, when fruits such as apples or vegetables such as sweet potatoes are used as the base plant material, the resulting product retains the fiber content intrinsic to the source material. The dehydration and seasoning process maintains structural and biochemical integrity without the need for extraction, concentration, or additive supplementation.

As a result, the final composition provides a naturally high-fiber profile, including both soluble fibers (e.g., pectin) and insoluble fibers (e.g., cellulose), which may aid in digestive health, blood sugar regulation, and satiety. The absence of grains further allows the product to serve as a grain-free, gluten-free alternative to traditional breakfast cereals, without sacrificing textural appeal or nutritional functionality. This makes the composition particularly attractive for clean-label, whole-food-based, or low-glycemic product positioning in the functional food and snack sectors.

Allergen-Free Composition

In certain embodiments, the food composition disclosed herein is formulated to be free of the top 12 food allergens, thereby enhancing its suitability for individuals with food allergies or sensitivities. The top 12 allergens typically include: milk, eggs, fish, shellfish, tree nuts, peanuts, wheat, soybeans, sesame, mustard, sulfites, and lupin. The disclosed composition avoids these allergens by relying exclusively on whole plant materials such as fruits and vegetables as the base, and using seasoning ingredients that are also derived from allergen-free plant sources.

Importantly, the composition does not incorporate grains, dairy, nuts, legumes, or any protein isolates or binders commonly associated with allergen risk. No emulsifiers, starches, or texturizing agents derived from wheat, soy, or dairy are required to achieve the desired structure, flavor, or mouthfeel. The absence of these ingredients eliminates the need for complex allergen controls or labeling exemptions and simplifies compliance with allergen disclosure regulations in global markets.

The allergen-free nature of the composition allows for safe consumption across a broad population, including children, individuals with food intolerances, and those adhering to elimination diets. Additionally, manufacturing can be readily adapted to dedicated allergen-free processing environments, further supporting commercialization in schools, hospitals, and regulated institutional settings. This feature of the disclosure supports product claims such as "top 12 allergen-free," "school-safe," and "made in an allergen-free facility," enabling greater market access and consumer trust.

Crispness-Related Attributes
Fracture Force (N)

In the context of food texture analysis, fracture force refers to the amount of mechanical force required to initiate breakage of a food sample. While often associated with structural strength, a higher fracture force does not necessarily indicate a superior product-particularly for snacks intended to be light and crisp. In crisp foods, a lower fracture force is generally more desirable, as it reflects a brittle structure that breaks easily and cleanly during mastication. In contrast, a higher fracture force may suggest a denser, chewier, or leathery texture, which may be less appealing for dry snack applications.

Fracture Events (Count)

The number of fracture events—also known as fracture points or break peaks—is a critical measure of brittleness and crispness in texture profile analysis. Each fracture event corresponds to a distinct break in the material's structure. A higher number of fracture events typically indicates a brittle, multi-cellular or porous matrix, which fractures repeatedly and audibly during biting or compression. This is a hallmark of crisp snack foods such as chips or toasted cereals. In contrast, a low number of fracture events suggests the product yields in a single, dull break or compresses without fracturing—characteristics associated with chewy or soft textures.

Acoustic Intensity (dB)

Crispness is not only felt—it is heard. Acoustic intensity, often measured in decibels (dB) during instrumental testing, correlates with the audible response of a product during fracture. Products with high acoustic intensity produce loud, sharp sounds when broken, which consumers associate with freshness and crispness. The measurement is obtained via a microphone during mechanical compression or fracture testing. Higher acoustic intensity values are predictive of consumer-perceived crispness, especially when combined with a high number of fracture events. Products with low acoustic output tend to feel stale, soft, or chewy.

Panel Crispness Score (1-10)

Sensory evaluation by trained human panelists remains a benchmark for textural quality. Panel crispness score is typically based on a hedonic or descriptive scale (e.g., 1-10), where panelists rank the perceived crispness of a sample during consumption. These scores integrate tactile, auditory, and textural sensations and often correlate closely with instrumental data. A higher panel crispness score indicates a more favorable eating experience, characterized by breakability, crunch, and perceived freshness. This metric provides real-world validation of mechanical and acoustic test data and is especially useful in consumer-focused food product development Kits In embodiments, the disclosure provides a kit that comprises the food composition taught herein, together with all necessary packaging, components, and instructions for end-users to prepare and consume the product as intended.

The kit typically includes a container or package—such as a cereal box, snack pouch, or similar receptacle—that is pre-labeled with dietary information, nutritional facts (including caloric content, macronutrient profile, and fiber content), and ingredient lists.

For example, the packaging may indicate that a one-cup serving of the composition contains approximately 130 kilocalories, zero added sugars, and ~ 5 grams of dietary fiber.

In addition to the packaged food composition, the kit further comprises printed or digital instructions and/or advertisements that explain how to combine the composition with milk or milk alternatives to achieve a complete breakfast cereal experience. The instructions may detail recommended serving sizes, suggest complementary liquids (dairy milk or plant-based alternatives such as almond, soy, or oat milk), and provide guidance on the expected sensory attributes-such as extended crispness and a satisfying crunch-upon combination. Such instructions may also include additional usage suggestions, storage information, and preparation tips, all aimed at enhancing consumer understanding and satisfaction.

The kit embodiment is advantageous for product commercialization as it not only presents the taught food compositions in a ready-to-use, consumer-friendly format, but it also facilitates compliance with food labeling and allergen disclosure regulations.

By bundling the disclosure's food composition with clear nutritional information, ingredient lists, and usage directions, the kit ensures that consumers are well-informed about the benefits and proper usage of the product. This integrated approach supports marketing claims related to grain-free, allergen-free, and high-fiber attributes, while simultaneously providing an accessible, convenient product experience.

In certain embodiments, the present disclosure provides a kit comprising the food composition produced in accordance with the process of claim 1, together with packaging and instructional or promotional materials that facilitate its use.

The kit may include a sealed container or outer box, such as a cereal box, pouch, plastic enclosure with zipper seal, reclosable seal, or resealable closure, or other food-safe packaging, which encloses one or more servings of the dehydrated, seasoned plant-based composition.

The packaging may be designed for ambient shelf stability and may include oxygen-barrier liners, desiccant packs, or vacuum seals to extend product life.

The kit may further include labeling or informational indicia printed directly on the packaging or provided on inserts therein. Such indicia may include nutritional information (e.g., calories per serving, fiber content, added sugar content, allergen status), ingredient disclosures, serving size suggestions, and dietary suitability statements (e.g., gluten-free, vegan, paleo).

In certain embodiments, the kit may explicitly direct the consumer to combine the food composition with milk or a milk alternative in order to create a cereal-like eating experience. Such instructions may take the form of written directions, pictographic illustrations, or marketing copy such as "Enjoy with milk!" or "Pair with milk for a satisfying crunch." In aspects, the kit's "instructions" are an image of the taught food composition immersed in a white liquid, which a consumer would understand to be milk.

In some embodiments, the kit may be configured as a single-serving, ready-to-eat package, such as a snack pack or cereal cup, optionally preloaded with a dry powdered milk component or paired with a separately sealed shelf-stable liquid. In other embodiments, the kit may be part of a multi-pack or bulk offering intended for regular consumer use, such as a weekly cereal supply. The flexibility of the kit design allows for broad adaptation across retail, direct-to-consumer, institutional, or medical nutrition channels In some embodiments, the kit's contain additional food ingredients. For example, in some grain-free cereal embodiments, the kit will also contain an additional fruit, e.g. freeze dried strawberries or "fruit puffs."

Grain-Free "Granola" Snack Compositions

In certain embodiments, the food composition produced in accordance with the process of the disclosure may serve as a grain-free alternative to traditional granola snacks. The product's crisp, dry texture and rich flavor profile-achieved through a dual-dehydration and seasoning process-enables it to function as a standalone snack or as a granola-like component in parfaits, yogurt toppings, smoothie bowls, or trail mixes. The base plant material, such as fruit or vegetable slices, provides inherent structure and fiber, while seasoning ingredients such as cinnamon, powdered fruits, or salts enhance flavor without the need for added sugars or binders.

Unlike conventional granola, which often relies on rolled oats, syrups, and baking to achieve clumping and crunch, the disclosed composition is entirely grain-free and contains no refined carbohydrates. This allows for a clean-label, paleo-compatible snack product that meets the demands of consumers seeking gluten-free, allergen-conscious, or whole-food formulations.

In some embodiments, the seasoned second dehydrated base plant material form factors may be provided in clustered or chip-like forms that resemble granola chunks in both hand-feel and mouthfeel, but with improved nutritional transparency and shelf stability.

EXAMPLES

Example 1: Process for Creating a Food Composition

Organic apples were sourced from a commercial grower and mechanically cut into uniform pieces having approximately square to rectangular form factors. This geometric consistency facilitated even dehydration and enhanced the final product's visual and tactile appeal.

The apple pieces were subjected to a first dehydration step using a convective hot air drying system. The drying chamber was maintained at a temperature and for a duration to achieve the desired moisture content. This process reduced the moisture content of the apple pieces to between about 10% and 15% by weight, yielding a first dehydrated base plant material suitable for seasoning and further processing.

Following initial dehydration, the apple pieces were subjected to a seasoning step. A range of flavoring ingredients was tested, including cinnamon, as well as powdered fruit matter derived from each of strawberry, blueberry, mango, or banana. When fruit-based seasonings were employed, the fruits were first freeze-dried and then ground into a fine powder. The resulting particulate matter was applied by uniform surface dusting onto the partially dehydrated apple pieces. Notably, retaining approximately 10-15% residual water in the apple tissue at this stage allowed for further absorption of the seasoning during subsequent processing.

Figure 2:
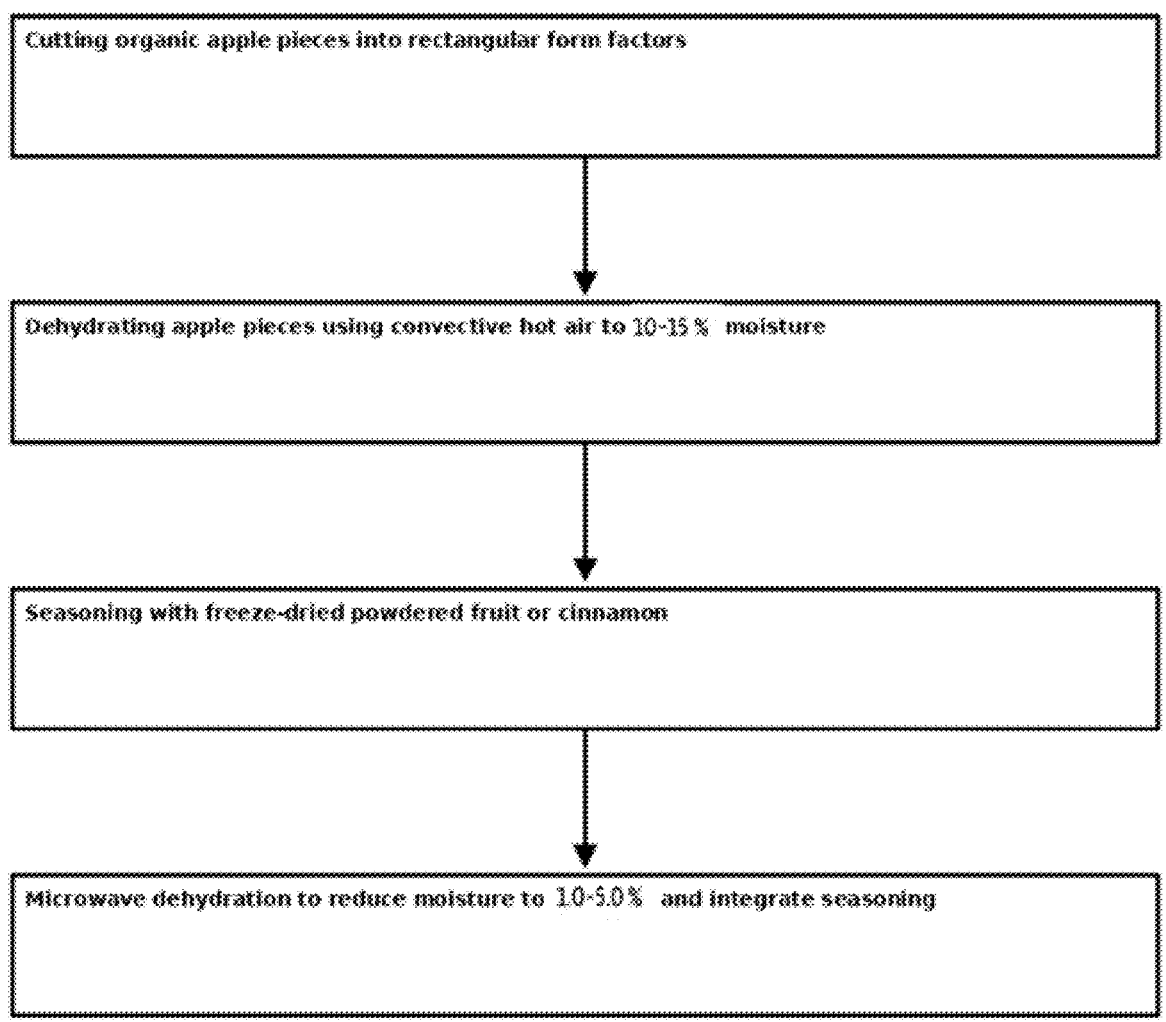
FIG. 2 is a flowchart illustrating the process utilized in Example 1.

The seasoned apple pieces were then exposed to a second dehydration step using a microwave heat source. The samples were irradiated for a duration sufficient to achieve the desired moisture content. This step further reduced the residual moisture content to between approximately 1.0% and 5.0% by weight. As the remaining moisture evaporated under microwave heating, the flavoring ingredient was drawn into the porous plant matrix, resulting in a seasoned second dehydrated base plant material with integrated flavor and enhanced crispness. These steps are depicted in FIG. 2.

Example 2: Comparative Evaluation of Second Heat Source Types

A comparative study was conducted to evaluate the effect of different second heat sources on seasoning absorption and final product quality. The objective was to determine whether a conventional convective heat source could serve as an effective substitute for a microwave heat source in the second dehydration step described in Example 1.

Organic apple pieces were processed according to the method described in Example 1 through the initial stages, including cutting into square and rectangular form factors and dehydration using hot air to achieve a water content of approximately 10-15% by weight. The partially dehydrated apple slices were then seasoned with freeze-dried and powdered strawberry as the flavoring agent, applied uniformly via dusting.

The seasoned apple pieces were then subjected to further dehydration using the same hot air dryer as in the first dehydration step. The drying temperature and time were adjusted to reduce moisture content to between approximately 1.0% and 5.0% by weight.

Upon evaluation, it was observed that the apple pieces processed with microwave heating (Example 1) exhibited significantly improved seasoning ingredient integration, with visible and sensory indications that the powdered strawberry had been absorbed into the internal tissue of the apple matrix. These samples, prepared according to Example 1, demonstrated a crisp, airy texture and a vibrant coloration corresponding to internalized seasoning.

In contrast, the apple pieces processed using convective heating in both steps retained the powdered seasoning primarily on the exterior surface. The seasoning did not visibly penetrate the apple matrix, and a greater proportion of the seasoning was lost to the drying environment. These samples were noticeably less crisp, and their texture more closely resembled a leathery or chewy dried fruit product. These apple pieces did not maintain the same level of crunch as those prepared according to Example 1.

These results demonstrate that microwave heating, as a second dehydration step (e.g. in Example 1) offers a functional advantage in enabling flavor infusion through moisture-driven absorption.

Figure 3:
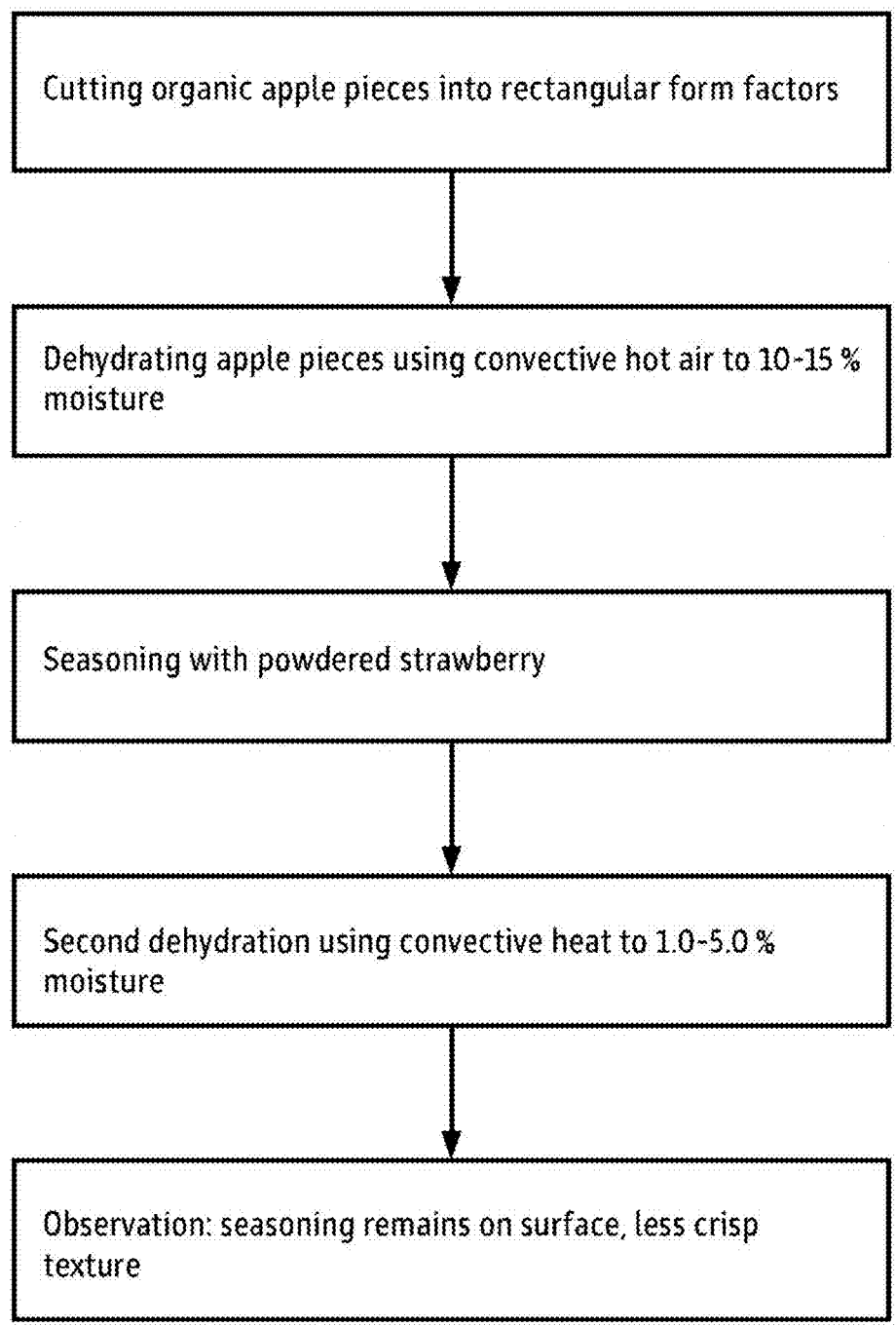
FIG. 3 is a flowchart illustrating the process utilized in Example 2.

The volumetric nature of microwave heating facilitates inward migration of seasoning components as residual water is evaporated from within the plant tissue. This surprising outcome could not be replicated using surface-based convective heating as the second heating step, even under matched final moisture conditions. These steps are depicted in FIG. 3.

Example 3: Process for Creating a Food Composition Using Sweet Potato and Salt

Fresh sweet potatoes were sourced from a commercial supplier, washed, and cut into uniform slices using a mechanical slicer. The slices were approximately 3-4 mm in thickness to ensure consistent dehydration. The form factor was selected to resemble a conventional chip or crisp, facilitating consumer familiarity and efficient heat transfer during drying.

The sliced sweet potato pieces were subjected to a first dehydration step using a convective hot air drying system. The drying chamber was maintained for a period of time and at a temperature, which was sufficient to reduce the moisture content to between 20% and 40% by weight. The partially dehydrated sweet potato pieces retain sufficient pliability for subsequent seasoning and are structurally intact.

The partially dehydrated sweet potato pieces were then seasoned with finely ground sodium chloride (table salt). The salt was applied via dusting technique to uniformly coat the surface of the sweet potato matrix. No additional oil or binders were used. The retained moisture in the dehydrated sweet potato pieces provided sufficient surface tack to facilitate initial adherence of the salt particles.

The seasoned sweet potato pieces were subjected to a second dehydration step using microwave heating. The pieces were placed in a microwave oven and irradiated for a duration of time sufficient to achieve the desired moisture level. During this step, residual moisture was reduced to between 1.0% and 5.0% by weight. The drying process resulted in the salt becoming integrated into the surface layers of the sweet potato matrix. The finished product exhibited a crisp texture and a uniformly seasoned flavor profile, without material visual separation or flaking of the salt.

Figure 4:
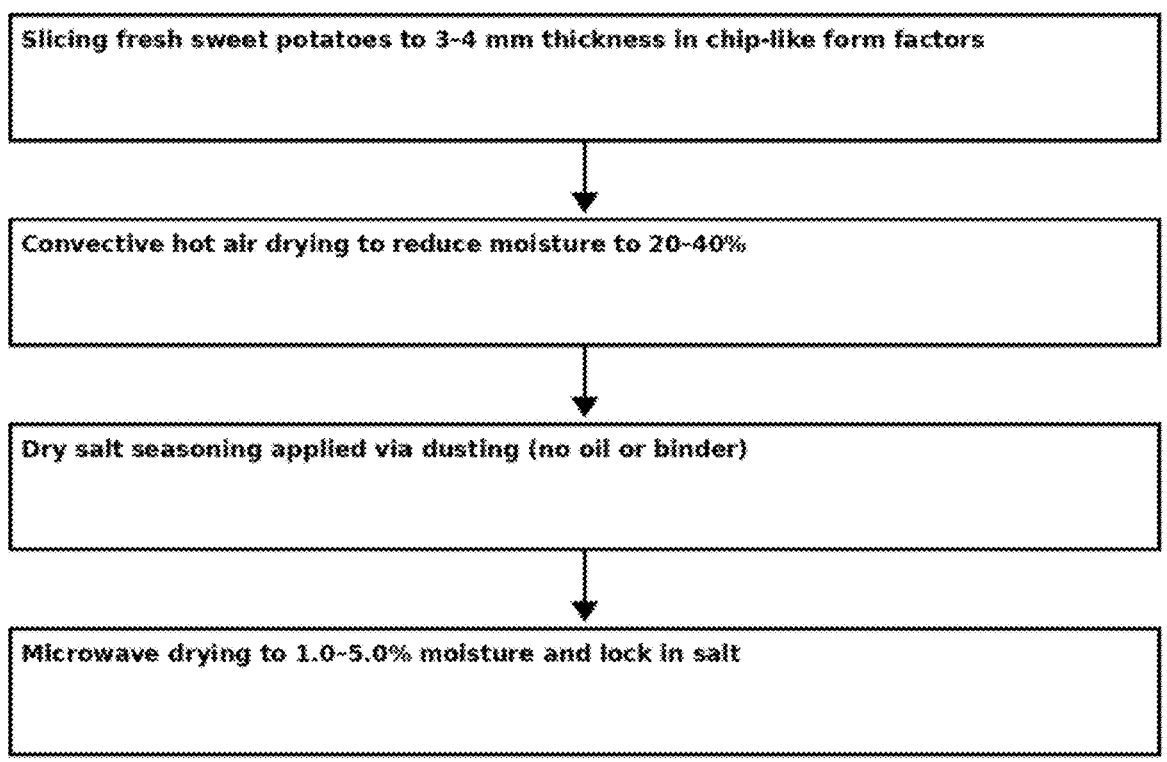
FIG. 4 is a flowchart illustrating the process utilized in Example 3

This example demonstrated the applicability of the disclosed method to vegetable-based base plant materials and to simple, single-component seasoning ingredients. The use of microwave energy in the second dehydration step facilitated superior integration of the seasoning and desirable textural outcomes. These steps are depicted in FIG. 4.

Example 4: Use of the Food Composition as a Grain-Free Cereal

A food composition was prepared in accordance with the process of Example 1, wherein the base plant material comprised organic apple slices and the seasoning ingredient comprised powdered strawberry. The apple slices were first dehydrated using a hot air dryer to reduce the moisture content to approximately 10-15% by weight. The partially dehydrated slices were then dusted with freeze dried strawberry powder and subjected to a second dehydration step using microwave heating, resulting in a final moisture content of approximately 1.0-5.0% by weight, and incorporation of the strawberry fruit matter seasoning into the apple pieces. The resulting product exhibited a light, crisp texture and uniform seasoning absorption.

The dehydrated, seasoned apple slices were then combined with chilled dairy milk in a standard breakfast bowl in a manner analogous to conventional ready-to-eat breakfast cereals. The food composition retained its crispness for an extended period after exposure to milk, maintaining structural integrity and providing a satisfying crunch during consumption. This behavior is attributed to the low final moisture content and microstructural properties imparted by the microwave drying process.

The composition, being entirely free of grains, provides a suitable alternative for consumers seeking gluten-free or grain-free breakfast products. Additionally, the inherent sweetness of the apple base combined with the added strawberry seasoning provided a palatable flavor profile without requiring added sugars or preservatives. The product may also be consumed with plant-based milk alternatives, including almond milk, oat milk, or soy milk, while preserving its textural properties.

A further nutritional advantage of the disclosed cereal composition lies in its high dietary fiber content. Apples are naturally rich in both soluble and insoluble fiber—particularly pectin and cellulose—and this fiber profile is largely preserved through the dehydration process. Because the method utilizes whole plant slices without refining, juicing, or fiber extraction, the final product delivers meaningful fiber content without the need for added fiber ingredients such as inulin or chicory root extract.

A standard serving size of the food composition may comprise approximately one cup (about 30 grams). Each serving contains approximately 130 calories, 0 grams of added sugar, and approximately 5 grams of total dietary fiber. The caloric and fiber content may vary depending on the specific base plant material and seasoning used, but the formulation is designed to provide a nutrient-dense, satiating meal component suitable for daily consumption.

As such, the disclosed composition offers a high-fiber, no-added-sugar grain cereal alternative that supports digestive health and satiety while maintaining a clean-label profile. The absence of added functional additives simplifies formulation, enhances transparency to the consumer, and supports regulatory-friendly product positioning in the natural foods segment.

Example 5: Prophetic Comparison of Product Crispness Based on Second Heat Source It is anticipated that the food composition produced in accordance with Example 1-utilizing a microwave heat source in the second dehydration step-will exhibit superior crispness compared to the composition of Example 2, which employs a convective heat source in both dehydration stages. Although a direct comparative study has not yet been conducted, this expectation is based on the differing thermal and structural effects imparted by the two dehydration methods.

In the process of Example 1, the second dehydration step involves microwave radiation, which is known to heat food materials volumetrically rather than by surface conduction alone. This internal heating accelerates moisture migration from the center of the plant matrix to the exterior, creating internal vapor pressure and promoting the formation of porous, expanded structures. As a result, the final product is expected to exhibit a crisp, light texture with a rapid and multi-fracture response under mechanical force-characteristics commonly associated with highly crisp snack foods.

By contrast, the food composition of Example 2 relies solely on convective hot air drying for both dehydration stages. Convective drying primarily removes moisture from the surface, resulting in a more gradual and less uniform internal moisture gradient. This may lead to denser tissue collapse, reduced porosity, and a chewier, less crisp final product. Furthermore, the lower rate of internal vapor generation in convective drying is expected to limit the expansion and aeration effects observed in microwave-treated samples.

Based on these mechanisms, it is expected that objective measurements of crispness (e.g., using a texture analyzer or acoustic-mechanical testing) would show higher fracturability, greater number of fracture events, and louder acoustic signals for the Example 1 product compared to that of Example 2. Similarly, sensory evaluations conducted by trained panels are expected to favor the microwave-treated composition with respect to crispness, perceived lightness, and consumer acceptability.

Figure 5A:
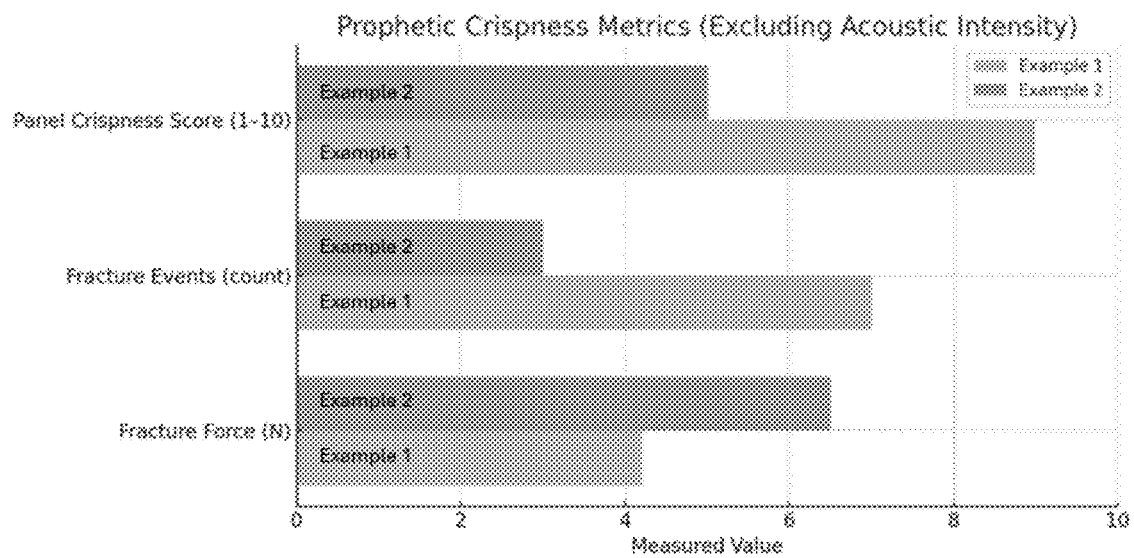
FIG. 5A and FIG. 5B illustrate a prophetic data set demonstrating a comparison of crispness-related attributes between products produced according to either Example 1 or Example 2.
Figure 5B:
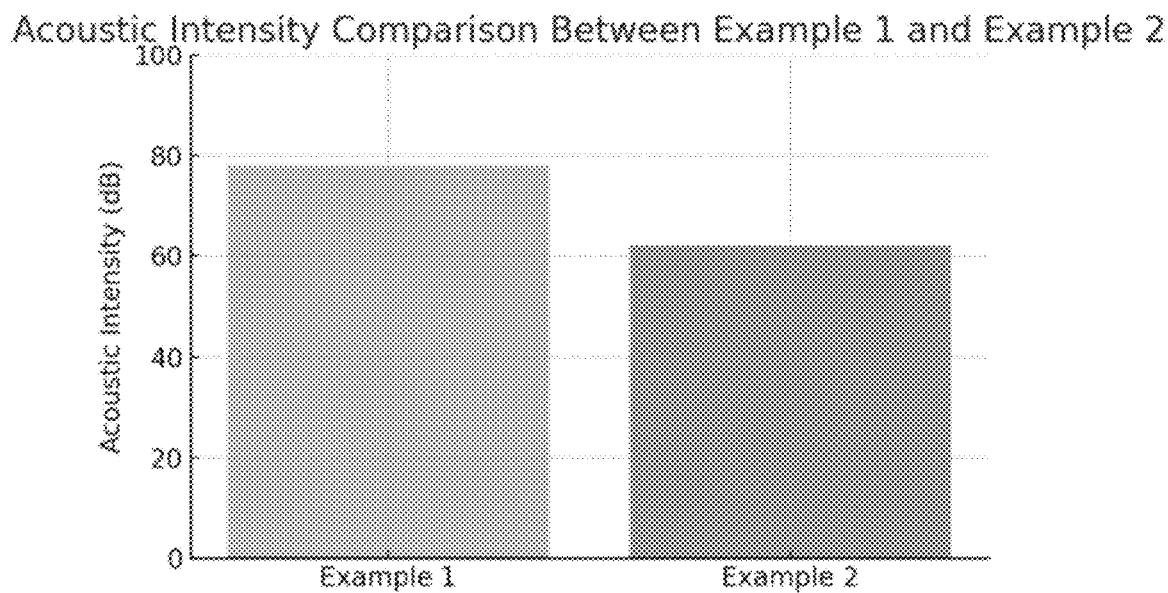

FIGS. 5A and 5B show a prophetic comparison of crispness-related attributes between Example 1 and Example 2. We expect that should an experiment like the aforementioned Example 5 be conducted, then we will see similar trends in the results.

It is noted that the fracture force required to break the Example 2 product may be higher than that of the Example 1 product. However, this higher force does not correlate with increased crispness. Rather, a higher fracture force typically reflects a denser, tougher structure more characteristic of chewy or leathery textures. In contrast, the Example 1 product is expected to exhibit lower fracture force, but a greater number of fracture events, indicating a brittle, multipoint fracture profile consistent with crisp snack foods. Accordingly, a lower fracture force combined with high acoustic activity and multiple discrete breaks is more predictive of desirable crispness in dehydrated plant-based products.

Proposed Testing Protocol for Crispness Evaluation for Prophetic Example 5

To evaluate the crispness of food compositions produced according to Example 1 and Example 2, the following methodology may be employed:

Sample Preparation

Each sample shall be stored under ambient conditions for 24 hours after production and equilibrated to room temperature (approximately 22° C.) prior to testing. Testing shall be conducted on at least 10 replicates per group.

Instrumental Texture Analysis

Apparatus: A TA.XT Plus Texture Analyzer (Stable Micro Systems) or equivalent.

Test: Three-point bend test using a crisp fracture rig.

Parameters Measured: Fracture Force (N): Peak force at initial break; and Fracture Events (count): Number of discrete force drops in the curve, indicating brittle failure behavior.

Acoustic Analysis

Apparatus: Texture Analyzer equipped with an acoustic envelope detector and high-sensitivity microphone.

Metric: Acoustic intensity (dB) and duration of high-frequency fracture noise.

Sensory Evaluation

Panel: Minimum of 12 trained panelists.

Method: Time-intensity scoring for "initial crispness" and "lingering crunch."

Scale: 1-10 hedonic or quantitative descriptive score.

Moisture Analysis

Method: Appropriate AOAC standard or equivalent standard.

Target: Final product moisture content between 1.5%-2.5%.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" embodiment, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other, but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including, but not limited to. Only the transitional phrases "consisting of" and "consisting essentially of" shall be closed or semi-closed transitional phrases.

It should be appreciated that embodiments described in this document using an open-ended transitional phrase (e.g., "comprising") are also contemplated, in alternative embodiments, as "consisting of" and "consisting essentially of" the feature described by the open-ended transitional phrase. For example, if the disclosure describes "a composition comprising A and B," the disclosure also contemplates the alternative embodiments "a composition consisting of A and B" and "a composition consisting essentially of A and B."

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as, an acknowledgment or any form of suggestion that they constitute valid prior art or form part of the common general knowledge in any country in the world.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present disclosure, and without departing from the spirit and scope thereof, can make various changes and modifications of the disclosure to adapt it to various usages and conditions. Thus, other embodiments are also within the claims.

NUMBERED EMBODIMENTS OF THE DISCLOSURE

Notwithstanding the appended claims, the disclosure sets forth the following numbered embodiments:

Embodiment 1. A process for creating a food composition, comprising: (a) providing a base plant material form factor; (b) exposing said base plant material to a first heat source to dehydrate the base plant material and create a first dehydrated base plant material form factor; (c) seasoning the first dehydrated base plant material form factor with an ingredient to create a seasoned first dehydrated base plant material form factor; and (d) exposing said seasoned first dehydrated base plant material form factor to a second heat source to create a seasoned second dehydrated base plant material form factor.

Embodiment 2. The process of embodiment 1, wherein the base plant material is a fruit or fruit part.

Embodiment 3. The process of embodiment 1, wherein the base plant material is a vegetable or vegetable part.

Embodiment 4. The process of any one of embodiments 1-3, wherein the base plant material is a plant tissue.

Embodiment 5. The process of any one of embodiments 1-4, wherein the base plant material is not a grain.

Embodiment 6. The process of any one of embodiments 1-5, wherein the base plant material form factor is at least one selected from the group consisting of: a polygon, a quadrilateral, and an ellipse.

Embodiment 7. The process of any one of embodiments 1-6, wherein the base plant material form factor is at least one selected from the group consisting of: a triangle, a quadrilateral, a pentagon, a hexagon, a heptagon, an octagon, a nonagon, and a decagon.

Embodiment 8. The process of any one of embodiments 1-7, wherein the base plant material form factor is at least one selected from the group consisting of: a parallelogram, a rhombus, a kite, a rectangle, a square, a trapezoid, and an isosceles trapezoid.

Embodiment 9. The process of any one of embodiments 1-8, wherein the base plant material form factor is at least one selected from the group consisting of: an oval and a circle.

Embodiment 10. The process of any one of embodiments 1-9, wherein the base plant material form factor is at least one selected from the group consisting of: a chip or a crisp.

Embodiment 11. The process of any one of embodiments 1-10, wherein the first heat source is at least one selected from the group consisting of: a radiant heat source, a convective heat source, and a conductive heat source.

Embodiment 12. The process of any one of embodiments 1-11, wherein the first heat source is hot air.

Embodiment 13. The process of any one of embodiments 1-12, wherein the first heat source is hot air administered under vacuum conditions.

Embodiment 14. The process of any one of embodiments 1-13, wherein the first dehydrated base plant material form factor comprises no more than about 40% water.

Embodiment 15. The process of any one of embodiments 1-14, wherein the first dehydrated base plant material form factor comprises no more than about 30% water.

Embodiment 16. The process of any one of embodiments 1-15, wherein the first dehydrated base plant material form factor comprises no more than about 20% water.

Embodiment 17. The process of any one of embodiments 1-16, wherein the first dehydrated base plant material form factor comprises no more than about 15% water.

Embodiment 18. The process of any one of embodiments 1-17, wherein the first dehydrated base plant material form factor comprises no more than about 12% water.

Embodiment 19. The process of any one of embodiments 1-18, wherein the first dehydrated base plant material form factor comprises between about 25% water and about 35% water.

Embodiment 20. The process of any one of embodiments 1-19, wherein the first dehydrated base plant material form factor comprises between about 10% water and about 15% water.

Embodiment 21. The process of any one of embodiments 1-20, wherein the ingredient is at least one selected from the group consisting of: heterologous plant material, homologous plant material, fruit matter, vegetable matter, plant tissue matter, non-plant matter, mineral, and salt.

Embodiment 22. The process of any one of embodiments 1-21, wherein the first dehydrated base plant material form factor is seasoned with an ingredient comprising a heterologous plant material.

Embodiment 23. The process of any one of embodiments 1-22, wherein the first dehydrated base plant material form factor is seasoned with an ingredient comprising a homologous plant material.

Embodiment 24. The process of any one of embodiments 1-23, wherein the first dehydrated base plant material form factor is seasoned with an ingredient comprising fruit matter.

Embodiment 25. The process of any one of embodiments 1-24, wherein the first dehydrated base plant material form factor is seasoned with an ingredient comprising vegetable matter.

Embodiment 26. The process of any one of embodiments 1-25, wherein the first dehydrated base plant material form factor is seasoned with an ingredient comprising plant tissue matter.

Embodiment 27. The process of any one of embodiments 1-26, wherein the first dehydrated base plant material form factor is seasoned with an ingredient not comprising plant matter.

Embodiment 28. The process of any one of embodiments 1-27, wherein the first dehydrated base plant material form factor is seasoned with an ingredient comprising a mineral.

Embodiment 29. The process of any one of embodiments 1-28, wherein the first dehydrated base plant material form factor is seasoned with an ingredient comprising salt.

Embodiment 30. The process of any one of embodiments 1-29, wherein the seasoned first dehydrated base plant material form factor comprises a fruit base plant material seasoned with matter from another fruit.

Embodiment 31. The process of any one of embodiments 1-30, wherein the seasoned first dehydrated base plant material form factor comprises a vegetable base plant material seasoned with salt.

Embodiment 32. The process of any one of embodiments 1-31, wherein the second heat source is at least one selected from the group consisting of: a radiant heat source, a convective heat source, and a conductive heat source.

Embodiment 33. The process of any one of embodiments 1-32, wherein the second heat source is an electromagnetic radiation heat source.

Embodiment 34. The process of any one of embodiments 1-33, wherein the second heat source is a microwave heat source.

Embodiment 35. The process of any one of embodiments 1-34, wherein the seasoned second dehydrated base plant material form factor comprises no more than about 5% water.

Embodiment 36. The process of any one of embodiments 1-35, wherein the seasoned second dehydrated base plant material form factor comprises no more than about 2.5% water.

Embodiment 37. The process of any one of embodiments 1-36, wherein the seasoned second dehydrated base plant material form factor comprises between about 1.5% water and about 2.5% water.

Embodiment 38. The process of any one of embodiments 1-37, wherein the seasoned second dehydrated base plant material form factor comprises a fruit base plant material seasoned with matter from another fruit.

Embodiment 39. The process of any one of embodiments 1-38, wherein the seasoned second dehydrated base plant material form factor comprises an apple base plant material seasoned with cinnamon.

Embodiment 40. The process of any one of embodiments 1-39, wherein the seasoned second dehydrated base plant material form factor comprises an apple base plant material seasoned with matter from at least one other fruit selected from the group consisting of: strawberry, blueberry, mango, and banana.

Embodiment 41. The process of any one of embodiments 1-40, wherein the seasoned second dehydrated base plant material form factor comprises a vegetable base plant material seasoned with salt.

Embodiment 42. A food composition produced by the process of any one of embodiments 1-41.

Embodiment 43. The food composition according to embodiment 42, further comprising milk.

Embodiment 44. The food composition according to embodiment 42, further comprising a fruit.

Embodiment 45. A kit, comprising: the food composition according to any one of embodiments 42-44.

Embodiment 46. A food composition, comprising: a seasoned dehydrated base plant material form factor, wherein the base plant material form factor has been exposed to two separate heating processes and a seasoning process; wherein the first heating process comprises convective hot air drying and the second heating process comprises microwave irradiation; wherein the seasoning process comprises exposure to a seasoning ingredient after the first heating process and before the second heating process; and wherein the seasoning ingredient is absorbed into the base plant material during exposure to the second heating process.

Embodiment 47. The food composition of embodiment 46, wherein the seasoned dehydrated base plant material form factor comprises no more than about 5% water.

Embodiment 48. The food composition of any one of embodiments 46-47, wherein the seasoned dehydrated base plant material form factor comprises no more than about 2.5% water.

Embodiment 49. The food composition of any one of embodiments 46-48, wherein the seasoned dehydrated base plant material form factor comprises between about 1.5% water and about 2.5% water.

Embodiment 50. The food composition of any one of embodiments 46-49, wherein the seasoned dehydrated base plant material form factor comprises a fruit or vegetable base plant material.

Embodiment 51. The food composition of any one of embodiments 46-50, wherein the seasoning ingredient is at least one selected from the group consisting of: heterologous plant material, homologous plant material, fruit matter, vegetable matter, plant tissue matter, non-plant matter, mineral, and salt.

Embodiment 52. The food composition of any one of embodiments 46-51, wherein the seasoned dehydrated base plant material form factor comprises a fruit base plant material and the seasoning ingredient is another fruit.

Embodiment 53. The food composition of any one of embodiments 46-52, wherein the seasoned dehydrated base plant material form factor comprises an apple base plant material and the seasoning ingredient is cinnamon.

Embodiment 54. The food composition of any one of embodiments 46-53, wherein the seasoned dehydrated base plant material form factor comprises an apple base plant material and the seasoning ingredient is matter from at least one other fruit selected from the group consisting of: strawberry, blueberry, mango, and banana.

Embodiment 55. The food composition of any one of embodiments 46-54, wherein the seasoned dehydrated base plant material form factor comprises a vegetable base plant material and the seasoning ingredient is salt.

Embodiment 56. The food composition according to any one of embodiments 46-54, further comprising milk.

Embodiment 57. The food composition according to any one of embodiments 46-54, further comprising a fruit.

Embodiment 58. A kit, comprising: the food composition according to any one of embodiments 46-57.

What is claimed is:

1. A process for creating a two-fruit ingredient food composition, comprising:
   a) providing a fruit base plant material form factor;
   b) exposing said fruit base plant material to a first dehydration step, consisting of:
   applying a convective heat source to dehydrate the fruit base plant material and create a first dehydrated fruit base plant material form factor comprising no more than about 30% water;
   c) seasoning the surface of the first dehydrated fruit base plant material form factor with a non-liquid and dry powdered fruit matter ingredient to create a seasoned first dehydrated fruit base plant material form factor; and
   d) exposing said seasoned first dehydrated fruit base plant material form factor to a second and final dehydration step, consisting of: applying a microwave heat source to create a seasoned second dehydrated fruit base plant material form factor comprising no more than about 5% water.

2. The process of claim 1, wherein the fruit base plant material form factor is at least one selected from the group consisting of: a chip or a crisp.

3. The process of claim 1, wherein the first dehydrated fruit base plant material form factor comprises no more than about 15% water.

4. The process of claim 1, wherein the non-liquid and dry powdered fruit matter ingredient is at least one selected from the group consisting of: heterologous plant material or homologous plant material.

5. The process of claim 1, wherein the first dehydrated fruit base plant material form factor is seasoned with an ingredient comprising a non-liquid and dry powdered fruit matter derived from heterologous plant material.

6. The process of claim 1, wherein the first dehydrated fruit base plant material form factor is seasoned with an ingredient comprising a non-liquid and dry powdered fruit matter derived from homologous plant material.

7. The process of claim 1, wherein the seasoned second dehydrated fruit base plant material form factor comprises no more than about 3% water.

8. The process of claim 1, wherein the seasoned second dehydrated fruit base plant material form factor comprises an apple base plant material seasoned with non-liquid and dry powdered fruit matter derived from at least one other fruit selected from the group consisting of: strawberry, blueberry, mango, and banana.

9. A process for creating a two-fruit ingredient food composition, consisting essentially of:
   a) providing a fruit base plant material form factor;
   b) exposing said fruit base plant material to a first dehydration step, consisting of: applying a convective heat source to dehydrate the fruit base plant material and create a first dehydrated fruit base plant material form factor comprising no more than about 30% water;
   c) seasoning the surface of the first dehydrated fruit base plant material form factor with a non-liquid and dry powdered fruit matter ingredient to create a seasoned first dehydrated fruit base plant material form factor; and
   d) exposing said seasoned first dehydrated fruit base plant material form factor to a second and final dehydration step, consisting of: applying a microwave heat source to create a seasoned second dehydrated fruit base plant material form factor comprising no more than about 5% water.

10. The process of claim 9, wherein the non-liquid and dry powdered fruit matter ingredient is at least one selected from the group consisting of: heterologous plant material or homologous plant material.

* * * * *